United States Patent [19]

Doss et al.

[11] Patent Number: 5,155,781
[45] Date of Patent: Oct. 13, 1992

[54] MULTIPLE OPTICAL FIBER SPLICE WITH SEALING END COVERS

[75] Inventors: Donald G. Doss, Austin; Donald K. Larson, Cedar Park; Charles M. Mansfield, Austin, all of Tex.

[73] Assignee: Minnesota Mining and Manufacturing Company, St. Paul, Minn.

[21] Appl. No.: 753,331

[22] Filed: Sep. 6, 1991

[51] Int. Cl.⁵ .............................................. G02B 6/38
[52] U.S. Cl. ........................................ 385/71; 385/98
[58] Field of Search ...................... 385/65, 70, 71, 83, 385/95, 97, 98, 136, 137

[56] References Cited

U.S. PATENT DOCUMENTS

| | | | |
|---|---|---|---|
| 3,864,018 | 2/1975 | Miller | 350/96 C |
| 4,028,162 | 6/1977 | Cherin et al. | 385/98 X |
| 4,029,390 | 6/1977 | Chinnock et al. | 350/96 C |
| 4,045,121 | 8/1977 | Clark | 350/96 C |
| 4,046,454 | 9/1977 | Pugh, III | 350/96 C |
| 4,102,561 | 7/1978 | Hawk et al. | 350/96.21 |
| 4,181,401 | 1/1980 | Jensen | 350/96.21 |
| 4,201,443 | 5/1980 | Hodge | 350/96.2 |
| 4,203,650 | 5/1980 | Millet et al. | 350/96.21 |
| 4,211,470 | 7/1990 | Stewart | 350/96.21 |
| 4,220,397 | 9/1980 | Benasutti | 350/96.21 |
| 4,254,865 | 3/1981 | Pacey et al. | 206/316 |
| 4,257,674 | 3/1981 | Griffin et al. | 350/96.21 |
| 4,258,977 | 3/1981 | Lukas et al. | 350/96.21 |
| 4,274,708 | 6/1981 | Cocito et al. | 350/96.21 |
| 4,300,815 | 11/1981 | Malsot et al. | 350/96.21 |
| 4,325,607 | 4/1982 | Carlsen | 350/96.21 |
| 4,339,172 | 7/1982 | Leather | 350/96.21 |
| 4,352,542 | 10/1982 | Tydings | 350/96.21 |
| 4,353,620 | 10/1982 | Schultz | 350/96.21 |
| 4,354,731 | 10/1982 | Mouissie | 350/96.21 |
| 4,391,487 | 7/1983 | Melman et al. | 350/96.2 |
| 4,435,038 | 3/1984 | Soes et al. | 350/96.21 |
| 4,470,180 | 9/1984 | Blomgren | 24/563 |
| 4,593,971 | 6/1986 | Clement et al. | 350/96.2 |
| 4,602,845 | 7/1986 | Anderton | 350/96.2 |
| 4,629,284 | 12/1986 | Malavieille | 385/71 X |
| 4,634,216 | 1/1987 | Calevo et al. | 350/96.21 |
| 4,662,713 | 5/1987 | Davies et al. | 385/71 X |
| 4,730,892 | 3/1988 | Anderson et al. | 350/96.21 |
| 4,740,411 | 4/1988 | Mitch | 428/178 |
| 4,762,390 | 8/1988 | Finzel | 385/71 X |
| 4,830,456 | 5/1989 | Kakii et al. | 385/71 X |
| 4,865,413 | 9/1989 | Hübner et al. | 350/96.21 |
| 4,871,227 | 10/1989 | Tilse | 350/96.21 |
| 4,930,859 | 6/1990 | Hoffman, III | 350/96.21 |
| 4,940,307 | 7/1990 | Aberson et al. | 350/96.21 |
| 4,973,126 | 11/1990 | Degani et al. | 350/96.21 |
| 5,016,970 | 5/1991 | Negase et al. | 350/96.21 |
| 5,037,179 | 8/1991 | Bortolin et al. | 385/54 |

FOREIGN PATENT DOCUMENTS

| | | |
|---|---|---|
| 82102571.5 | 12/1985 | European Pat. Off. . |
| 88303777.2 | 11/1988 | European Pat. Off. . |
| 52-19547 | 2/1977 | Japan . |
| 53-26142 | 3/1978 | Japan . |
| 58-9114 | 1/1983 | Japan . |
| 58-158621 | 9/1983 | Japan . |

OTHER PUBLICATIONS

Reliable Corelink TM Tomorrow's Fiber Optic Splice Today! Published by Reliance Comm/Tec-Copyright date of 1991 By E. C. Scholtens (5 pages).

Primary Examiner—John D. Lee
Attorney, Agent, or Firm—Gary L. Griswold; Walter N. Kirn; Jack V. Musgrove

[57] ABSTRACT

A device for splicing multiple optical fibers includes a splice element having means for holding the optical fibers, a splice body having a slot containing the splice element, and extensions on either end of the splice body for supporting a portion of the fibers. Each of the extensions has an end cover positionable in open and closed positions which provides protection to the fibers against environmental influences. The end covers may advantageously include collapsible compartments filled with a sealant material whereby, when the covers are moved to the closed positions, the sealant material is channeled towards the slot containing the splice element.

19 Claims, 3 Drawing Sheets

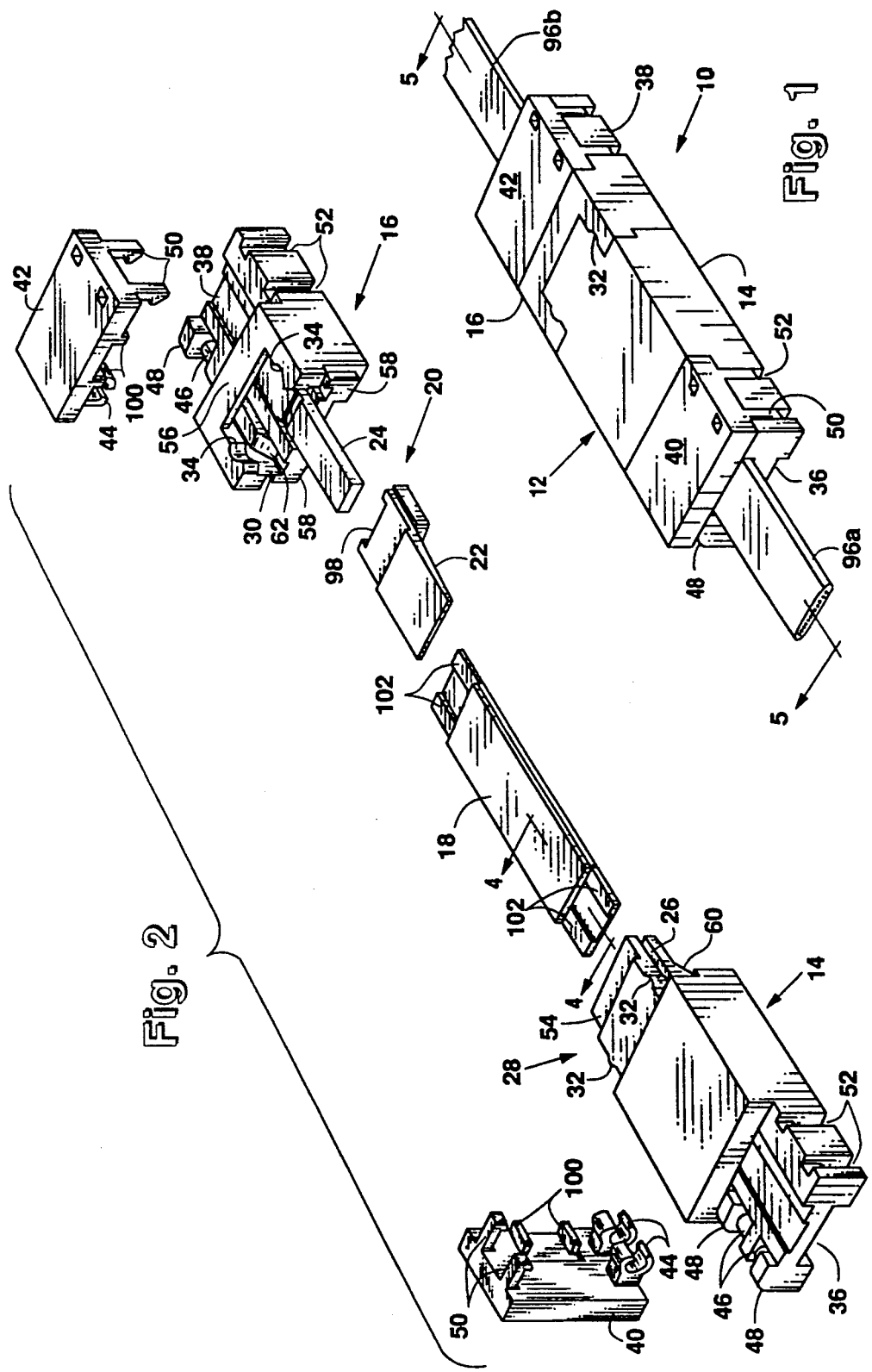

MULTIPLE OPTICAL FIBER SPLICE WITH SEALING END COVERS

BACKGROUND OF THE INVENTION

1. Field of the Invention

The present invention generally relates to devices for optically connecting the ends of waveguides such as optical fibers, and more particularly to an article which splices a plurality of pairs of such optical fibers.

2. Description of the Prior Art

Splice devices for optical fibers are known in the art, but there is still a need for a quick and reliable method of splicing a plurality of fibers in a high density environment. Prior to the introduction of splice devices which join a plurality of optical fibers in a single splice body (discussed further below), this was accomplished by utilizing a plurality of single fiber (discrete) splice devices. This approach was very time consuming, however, and further resulted in a large volume of splice bodies which crowd junction boxes, or require specialized splice trays to keep the fibers organized.

Several systems have been devised to address the problem of multiple fiber splicing. One technique, mass fusion welding, requires that each fiber be placed in a groove of a rigid substrate having several such grooves. Best fit averaging is used to align the fiber pairs and an electric arc is created, melting the fiber tips and permanently fusing them together. The primary, and very significant, limitation of fusion splicing is the great expense of the fusion welders. Fusion welding also precludes later fiber removal or repositioning.

Another common multiple splicing technique requires the use of adhesives, again with a substrate or tray that has a plurality of grooves therein. For example, in U.S. Pat. No. 4,028,162, a plurality of fibers are first aligned on a plastic substrate having fiber aligning grooves, and then a cover plate is applied over the fibers and the substrate, the cover plate having means to chemically adhere to the fiber and substrate. Adhesives are also used in the optical fiber splice devices disclosed in U.S. Pat. No. 4,029,390 and Japanese Patent Application (Kokai) No. 58-158621. The use of adhesives is generally undesirable since it adds another step to the splicing process, and may introduce contaminants to the fiber interfaces. Splice devices using adhesives also require extensive polishing of the fiber end faces to achieve acceptable light transmission, and some adhesive splices further require the use of a vacuum unit to remove trapped air.

The '390 patent represents an improvement over earlier multiple splice devices in that it utilizes a foldable holder having a series of V-grooves on both sides of a central hinge region. The method of attaching the fibers to the holder, however, presents additional problems not present in earlier splices. First of all, since adhesive is used to affix the fibers to the holder before splicing, the cleaving of the fibers becomes a critical step since the cleave length must be exact to avoid any offset of the fiber end faces, which would be extremely detrimental to splice performance. Secondly, it is critical that the opposing V-grooves be exactly aligned, which is unlikely with the hinge depicted in the '390 patent; otherwise, there will be transverse fiber offset resulting in increased signal loss. Finally, the '390 holder would not maintain the opposing plates perfectly parallel, which is necessary in order to optimize transverse alignment of the fiber pairs, and also affects fiber deformation.

Another problem with several of the foregoing splicing devices is that they used rigid substrates to clamp the fibers. There are several disadvantages to the use of rigid substrates. First of all, it is generally more difficult to form grooves in a rigid material, such as by etching, grinding or erosion, which increases manufacturing cost. Rigid substrates must also be handled more carefully since they are brittle and thus easily damaged. Most importantly, the use of a rigid substrate having grooves therein results in poor alignment of the fiber pairs (as well as unnecessary fiber deformation), leading to higher insertion loss. These problems are compounded in stacked configurations such as those shown in U.S. Pat. Nos. 3,864,018, 4,046,454 and 4,865,413.

These difficulties may be avoided by the use of a substrate which is malleable, elastomeric or ductile. Unfortunately, however, the use of such materials has not been fully appreciated nor implemented. For example, U.S. Pat. No. 4,046,454 teaches that the rigid V-grooves may be lined with a ductile material. This complicates the manufacturing process, however, and adds significant cost. In U.S. Pat. No. 4,102,561, the splice device utilizes two alignment members formed of a resilient material which may deform against the fiber surfaces. That splice, however, requires the attachment of two subassemblies prior to insertion of the fibers into the alignment members, and further uses about a dozen clamps and bolts, making the device very difficult to use in the field (similar problems apply to the device illustrated in U.S. Pat. No. 4,045,121). The primary clamping action directly at the fiber interface also causes deformation of the fiber resulting in more signal loss than if there were a more gradual clamping toward the interface. This problem also applies to other splice designs, such as that depicted in European Patent Application No. 88303777.2, which further suffers from the non-uniform application of clamping forces to different fibers.

In light of the foregoing, it would be desirable and advantageous to devise a high performance splice device for multiple optical fibers which does not require fusion welding, or adhesives and polishing. The device should provide a uniform clamping force to each of the fibers, and provide gradual clamping to minimize undesirable deformations such as microbending at the clamp transition. The cleave length of the fibers should not be critical, and means should be provided to optimize fiber alignment, including the use of malleable clamping surfaces. Finally, the splice should be simple to use, especially for field installation.

SUMMARY OF THE INVENTION

The foregoing objectives are achieved in a device for splicing multiple optical fibers comprising a splice element, a body surrounding the splice element, and a wedge providing uniform, transverse clamping of the fibers in the splice element. The body may be comprised of a jacket portion and a cap portion which interlock to hold the splice element. The splice element is preferably formed of a malleable material, and is hinged to define two plates, one plate having a series of parallel V-grooves, and the plates being folded together prior to actuation by the wedge. Stop pads are interposed between the plates to insure gradual clamping when the wedge is forcibly urged against the plates or against a tongue which is interposed between the plates and the wedge. The splice element may further have an extension or porch, with a ramp to facilitate insertion of the fibers into the splice element.

A stacked splice element may be provided in the body having more than two plates, e.g., a three-plate stack accommodating two layers of fiber splices. Special guides positioned at each end of the plates may be used to direct some fibers upward to one splice layer and others downward to the other layer. End covers are provided to protect the splice element and exposed fibers, and to provide an environmental seal.

BRIEF DESCRIPTION OF THE DRAWINGS

The novel features and scope of the invention are set forth in the appended claims. The invention itself, however, will, best be understood by reference to the accompanying drawings, wherein:

FIG. 1 is a perspective view of the multiple optical splice device of the present invention;

FIG. 2 is an exploded perspective view of the splice device of the present invention;

DESCRIPTION OF THE PREFERRED EMBODIMENT

Figure 3:
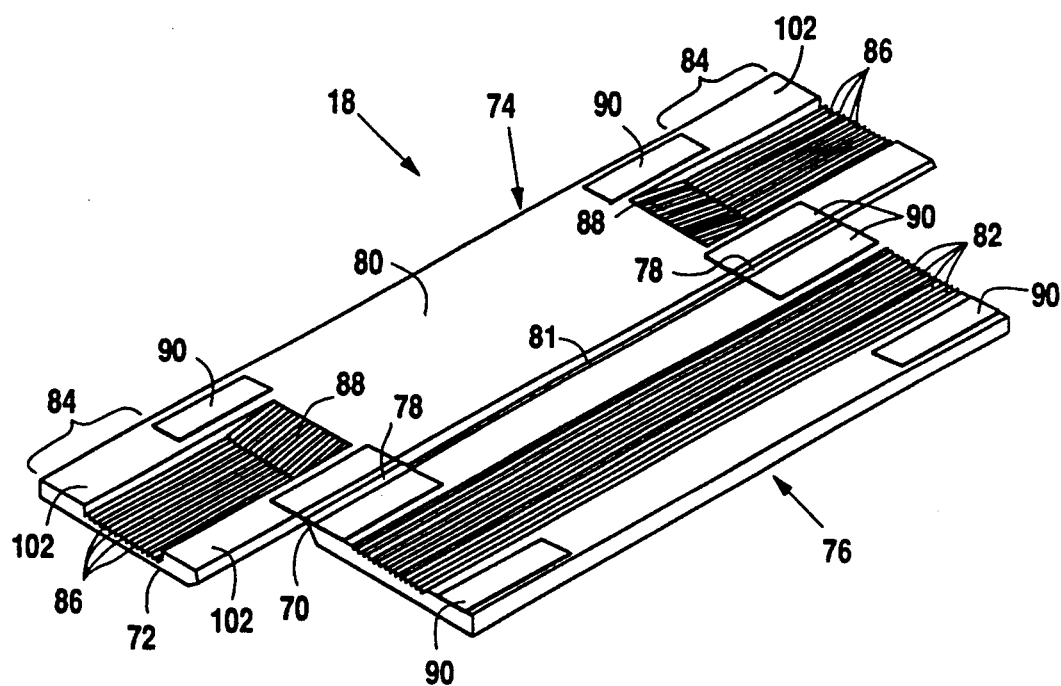
FIG. 3 is a perspective view of the splice element used in the multiple fiber splice device of the present invention, in its unfolded state.

With reference now to the figures, and in particular with reference to FIG. 1, there is depicted the multiple optical fiber splice device 10 of the present invention. Although the term "connector" may be applied to splice 10, that term is usually reserved for devices which are intended to provide easy connection and disconnection, as opposed to a splice which is usually considered permanent. Nevertheless, the term "splice" should not be construed in a limiting sense since splice 10 can indeed allow removal of the fibers, as explained further below.

With further reference to FIG. 2, splice 10 includes a generally rectangular body 12 which is essentially oomprised of a jacket 14 and a Cap 16. Splice 10 also includes a splice element 18 and longitudinal actuation means 20 for applying pressure to splice element 18. In the preferred embodiment, actuation means 20 comprises a wedge 22 having surfaces defining an acute angle, which is captured between jacket 14 and cap 16. A tongue 24, which is integrally molded with cap 16, is advantageously interposed between wedge 22 and splice element 18 as discussed further below. Jacket 14 has a longitudinal slot 26, rectangular in cross-section and extending through jacket 14, for receiving a splice element 18; slot 26 is slightly shorter than splice element 18, allowing both ends of element 18 to extend beyond the ends of slot 26. Jacket 14 also has an integrally molded male coupling element or projection 28 which fits within a cavity 30 formed in cap 16. Projection 28 has two transverse bumps 32 which snap into recesses 34 of cap 16, providing a snug fit between jacket 14 and cap 16.

Jacket 14 and cap 16 each have extensions 36 and 38, respectively, which receive end covers 40 and 42, respectively. Extensions 36 and 38 have recessed surfaces which support the fibers at the entrance to slot 26. End covers 40 and 42 impart protection to the spliced fibers and splice element 38 against environmental influences. End covers 40 and 42 are attached to extensions 36 and 38 of the jacket and cap, respectively, by any convenient means, such as arcuate jaws 44 which snap onto and rotatably grip trunnions 46. The side edges 48 of extensions 36 and 38 are rounded to allow end covers 40 and 42 to rotate on trunnions 46. End covers 40 and 42 also include hooks forming latches 50 which snap into notches 52 in extensions 36 and 38 and securely maintain the end covers in a tightly closed position.

Jacket 14 and cap 16 define many overlapping surfaces which impart additional environmental sealing and further inhibit separation of these two components of body 12 by, e.g., bending of body 12. For example, projection 2s has a lower tier 54 which slides under a canopy 56 formed on cap 16. Cap 16 also includes bosses 58 which fit into recesses (not visible in the Figures) in the corresponding face of jacket 14. Projection 28 and cap 16 further have inclined surfaces 60 and 62 which result in a greater contact surface area and make it more difficult to pop jacket 14 and cap 16 apart by bending them near their interface.

Figure 4:
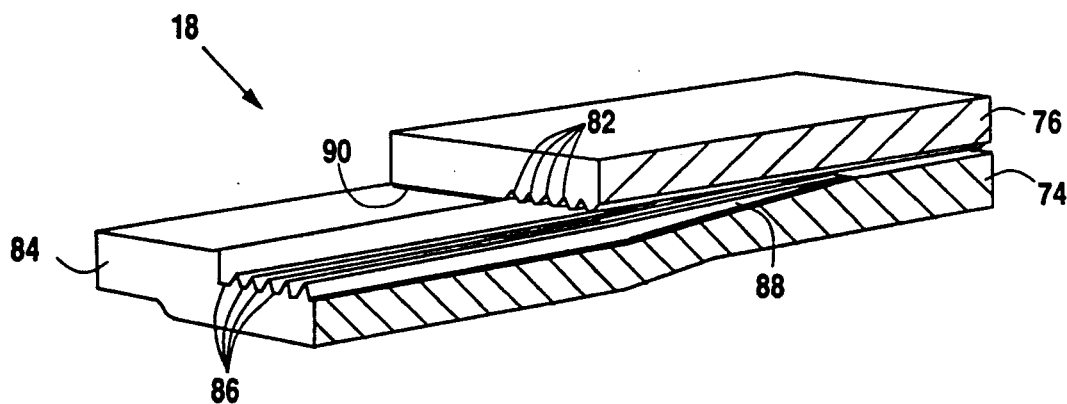
FIG. 4 is an enlarged sectional perspective of one end of the splice element of FIG. 3 showing the porch and ramp.

Turning now to FIGS. 3 and 4, splice element 18 is described in further detail. Splice element 18 may be formed from a sheet of deformable material, preferably a malleable metal such as aluminum, although polymeric materials may also be used. Material selection is described further below. Certain features are embossed, coined, stamped, molded or milled into element 18. First of all, a groove 70 is formed on the outside surface 72 of element 18. Groove 70 forms an area of reduced thickness to define a bend line or hinge, and separates element 18 into two legs Or plates 74 and 76 having essentially the same width. The hinge is preferably formed by additionally embossing a notch 78, opposite groove 70, on the inside surface 80 of element. This creates a "focus hinge" which provides more accurate registration of plates 74 and 76 when they are folded together, as explained further below. A slot 81 may also be punched out of element 18 to facilitate folding.

In one embodiment of the present invention, plate 76 has a series of V-shaped grooves 82 embossed on the inside surface 80 of element 18. V-grooVes 82 are generally parallel With groove 70. Those skilled in the art will appreciate that the V-grooves may instead be formed in plate 74, or in both plates, and further that the shape of the grooves is not limited to a "V" cross-section. Nevertheless, in the preferred embodiment only one of the plates has grooves therein, and these are V-shaped having an interior angle of about 60°. In this manner, when a fiber is placed in one of the grooves and clamped by surface 80 of plate 74, the points of contact between element 18 and the fiber generally form an equilateral triangle which minimizes transverse offset and thus reduces signal loss in the splice.

Plate 74 is further distinguished from plate 76 in that plate 74 has extensions or porches 84 which also have grooves 86 therein, although 9rooves 86 do not extend the full length of plate 74. Grooves 86 are also wider than V-grooves 82 since it is intended that the portion of the fibers lying on porches 84 will still have their buffer coating, but this coating is stripped from the fiber ends which are clamped between plate 74 and V-grooves 82 (i.e., the buffered portions of the fiber have a larger diameter than the exposed portions). Grooves 86 are further recessed in surface 80, and are adjacent to ramps 88 leading up to surface 80, as more clearly seen in FIG. 4. Ramps 88 eliminate microbending (which causes further signal loss) which would result if the buffered portion of the fiber and the exposed portion were to lie in the same plane. In other words, the transition from buffered fiber to exposed fiber occurs proximate ramps 88. Accordingly, the height of ramps 88 is approximately equal to the thickness of the buffer surrounding the fiber. Ramps 88 may be formed in porch areas 84 although they are preferably formed in plate 74 whereby they lie under plate 76 when the plates are folded together.

As an alternative to ramps 88, recesses (not shown) may be provided in extensions 36 and 38, under porches 84, to allow the porches to be bent slightly downward. Such a construction would be most advantageous if the alignment grooves on the porch of the element were continuous with the V-grooves in the center of the element, i.e., both sets of grooves were formed in only one of the plates forming the splice element. In this manner, after the fibers had been inserted and the element actuated, the porches could be bent down to relieve bending strain on the fiber caused by the transition in the effective diameter thereof due to the buffer coating.

The number of V-grooves 82 and 86 in splice element 18 is variable, depending upon the desired application. Grooves 86 should be aligned with V-grooves 82 when splice element 18 is folded, to insure proper positioning of the fibers during the clamping operation. Thus, while registration of plates 74 and 76 is not as critical as with some prior art splice devices (since there are no V-grooves on plate 74 which directly oppose V-grooves 82) it is still beneficial to use the aforementioned focus hinge in order to optimize th alignment of grooves 82 and 86.

In the stamping process which creates splice element 18, stop pads 90 are also advantageously formed on both plates 74 and 76 at the corners of the rectangle defined by the overlap of the plates. These pads are slightly raised with respect to the otherwise flat inside surface 8o of element 18. In this manner, When element 18 is folded as in FIG. 1, stop pads 90 provide a clearance space between plates 74 and 76, facilitating insertion of the fibers therebetween. Alternative methods of providing such a clearance space will become apparent to those skilled in the art. More importantly, however, stop pads 90 insure that, when element 18 is actuated and clamps the fibers, the maximum clamping force is exerted only along the central width of element 18, and the clamping force gradually decreases moving from the center toward the ends of element 18. This gradual clampinq transition has been found to significantly reduce signal loss resulting from the deformation of the fibers, i.e., prior art splice devices exhibited an abrupt clamping deformation which induced higher losses.

Figure 5:
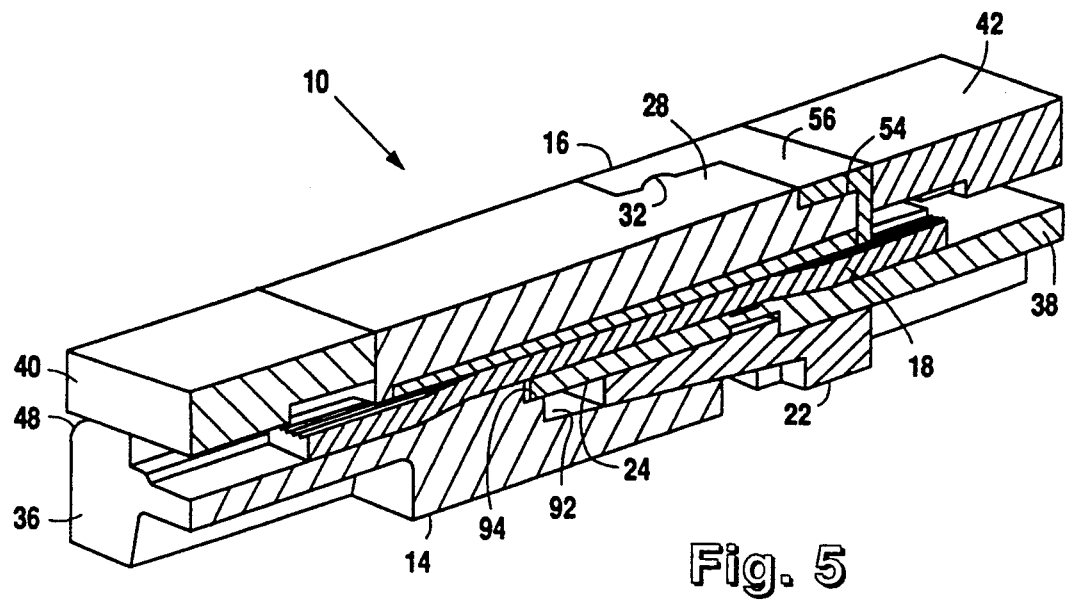
FIG. 5 is a sectional perspective view of the fully assembled splice device of the present invention.

Assembly and operation of splice 10 are both straightforward and may best be understood with reference to FIG. 5. Splice element 18 is placed in slot 26 in a folded state; in this state, clearance is still provided by stop pads 90 to allow insertion of the fibers, so this may be considered an open state, as opposed to the closed, clamping state. An index matching gel is preferably deposited near the center of element 18. Wedge 22 is then placed adjacent tongue 24, and jacket 14 is snapped into cap i6, whereupon wedge 22 becomes disposed against another ramp 92 formed in the lower portion of jacket 14. The upper surface of wedge 22 is generally parallel with plates 74 and 76, while the lower surface of wedge 22 is parallel with ramp 92. Tongue 24 is further supported at its distal end by a shelf 94 formed in the lower portion of jacket 14, above ramp 92. End covers 40 and 42 may be attached to extensions 36 and 38 at any time in the assembly process (although they are not snapped into the closed position until after the fibers have been spliced). All of the foregoing steps take place in the factory, and splice 10 is provided to the user in the state shown in FIG. 1 (less the fiber ribbon).

When the user has located the fibers to be spliced, they should be stripped and cleaved according to well-known methods. In this regard, splice 10 may be used to splice the fiber ribbons 96a and 96b shown in FIG. 1, or may be used to splice a plurality of individual, discrete fibers. Such discrete fibers may be more conveniently handled by first arranging them side-by-side and applying a piece of tape or other means to effectively create a fiber ribbon. If fiber ribbon is being spliced, the outer coating which surrounds the individual buffered fibers should also be removed.

Once the fibers or ribbons have been inserted into body 12, splice 10 may be actuated by longitudinally sliding wedge 22 toward jacket 14. In this regard, the term "longitudinal" refers to movement parallel with the fibers and grooves 82. The sliding action may be accomplished by simply using a screwdriver or other tool to push wedge 22 forward. The screwdriver may be applied to the cutout 98 formed in wedge 22. As wedge 22 moves forward onto ramp 92, it causes tongue 24 to press against the outer surface of plate 74, clamping the fibers between plates 74 and 76. The width of tongue 24 is approximately equal to the groove sets in the plates As discussed above, the clamping forces gradually decreases towards the ends of splice element 18 due to stop pads 90. This effect may be enhanced by making the lengths of wedge 22 and tongue 24 shorter than the length of plates 74 and 76 so that the clamping force is applied primarily at the center of splice element 18, and not at its ends. In the preferred embodiment, the length of that portion of wedge 22 contacting tongue 24 is about one-half the length of plate 76. The use of tongue 24 also prevents undue deformation of plate 74 which might otherwise occur if wedge 22 were to contact splice element 18 directly Wedge 22 provides excellent mechanical advantages, including high transmission of forces, and the uniform application of force parallel to plates 74 and 76. Also, due to the coefficient of friction of the materials used for jacket 14, wedge 22 and tongue 24, actuation means 20 (i.e., wedge 22) may be self-locking, provided it has an angle of less than about 9°. The preferred angle is about 5°. If wedge 22 is provided with a detent or catch 99, which abuts a facing surface of cap 16, then self-locking capability is unnecessary. Simplicity in the use of splice 10 is evident from a summary of the above steps: stripping and cleaving the fibers, inserting them into body 12, and sliding wedge 22 forward. A double wedge (not shown) may be used in lieu of single wedge 22.

After the splice is completed, end covers 40 and 42 may be moved to the closed, latched position to provide environmental sealing and protect the exposed fibers. In this regard, legs 100 of the end covers, which rest on stage areas 102 of porches 84, help keep the fiber ribbon aligned with splice body 12, i.e., they oppose sideways bending of the ribbon proximate the entrance to slot 26. Legs 100 also provide additional sealing of slot 26 since they are positioned at the sides thereof. Although not designed for disconnection and reconnection, splice 10 may allow removal of fibers by simply opening end covers 40 and sliding wedge 22 backward. A space 103 may be provided between jacket 14 and wedge 22, in the actuated state, to allow insertion of a screwdriver or other tool for this purpose.

Several different materials may be used in the construction of splice 10. Splice element 18 may be constructed from a variety of malleable metals, such as soft aluminum. The preferred metal is an aluminum alloy conventionally known as "3003," having a temper of 0 and a hardness on the Brinnell scale (BHN) of between 23 and 32. Another acceptable alloy is referred to as "1100," and has a temper of 0, H14 or H15. Acceptable tensile strengths vary from 35 to 115 megapascals.

Other metals and alloys, or laminates thereof, may be used in the construction of splice element 18. Such metals include copper, tin, zinc, lead, indium, gold and alloys thereof. It may be desirable to provide a transparent splicing element to facilitate the splicing operation. In such a case, a clear polymeric material may be used. Suitable polymers include polyethylene terephthalate, polyethylene terephthalate glycol, acetate, polycarbonate, polyethersulfone, polyetheretherketone, polyetherimide, polyvinylidene fluoride, polysulfone, and copolyesters such as Vivak (a trademark of Sheffield Plastics, Inc., of Sheffield, Mass.).

As an alternative to providing a splice element constructed of a deformable material, it may instead be formed of a more rigid material provided that V-grooves 82 and/or surface 80 are lined with a deformable material. The primary requisite is to provide a material which is softer than the glass comprising the optical fiber and cladding, and which is malleable under the clamping pressures applied to the optical fiber. It is also desirable that the material be elastic at low stress levels to afford sufficient elasticity to maintain a continual compressive force on the optical fibers once plates 74 and 76 have been brought together. Furthermore, a coating may be applied to the malleable material to reduce skiving of the material as the fiber is inserted. For example, an obdurate coating in the range of 1 to 2 $\mu$m may be applied to surface so of splice element 18.

Splice body 12 may also be constructed of a variety of materials, basically any durable material and preferably one that is injeotion moldable, although die cast metals are acceptable. The material should not be too rigid as it is desirable to allow the inner walls forming slot 26 to flex slightly to store excess clamping forces from wedge 22 in order to insure constant clamping force on the fibers during temperature cycling. Injection moldable materials include liquid crystal polymer, such as that sold under the trademark VECTRA A130 by Hoechst Celanese Corp. of Summit, N.J.

The dimensions of splice 10 may vary widely according to the desired application. The following (approximate) dimensions, for the preferred embodiment, are exemplary only and should not be construed in a limiting sense. The oVerall length of splice 10 is 38 mm, its height 6.7 mm and its width 13 mm. The length of the main portion of jacket 14 is 14 mm, while projection 28 is about 7.1 mm long and 9.7 mm wide. Cap 14 is 7.6 mm long, and extensions 36 and 38 are each 8.3 mm long.

Wedge 22 has an overall length of 14 mm, but the length of the portion contacting tongue 24 is 10 mm. The width of wedge 22 is 6.5 mm, while its maximum thickness is 1.5 mm and its minimum thickness is 0.76 mm.

With respect to splice element 18, several of the following approximate dimensions are based on the size of conventional multiple fiber ribbon cables. The length of plate 74 (including porches 84) is 28 mm, while the length of plate 76 is 20 mm. Both plates have a thickness of 530 $\mu$m, and stop pads 90 rise 18 $\mu$m above surface 80. V-grooves 82, preferably spaced 250 $\mu$m apart, are 130 $\mu$m deep and have a maximum width of 180 m. Grooves 86, which are approximately trapezoidal in the preferred embodiment, also have a maximum width of 80 $\mu$m, and a minimum width of 120 $\mu$m, and are 180 $\mu$m deep. Ramp 88 descends 250 $\mu$m, i.e., the upper surfaces of grooves 86 are 250 $\mu$m from surface 80.

Figure 6:
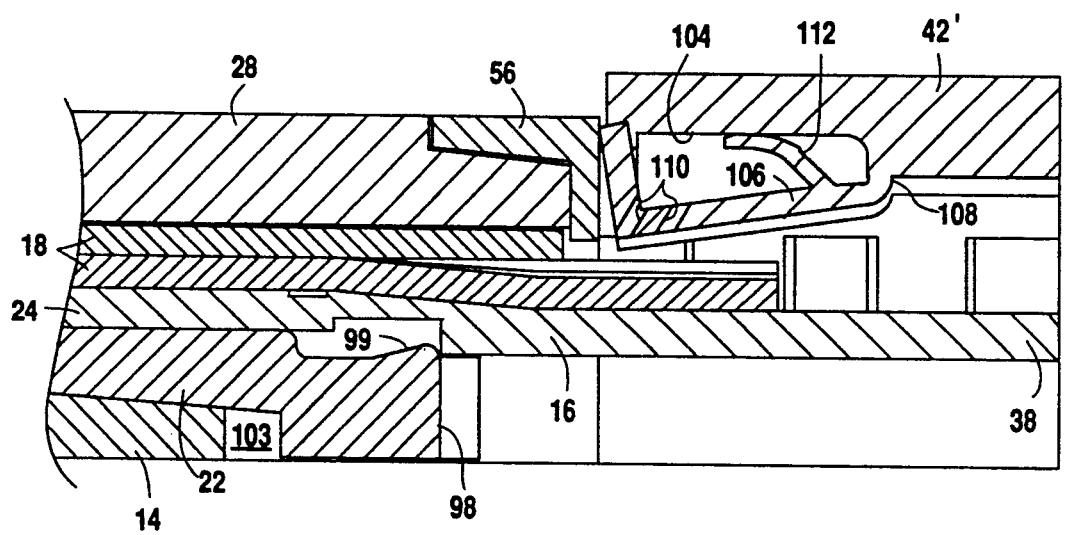
FIG. 6 is a sectional elevation of an alternative end cover used with the splice device of the present invention, having a compartment therein for index matching gel.
Figure 7:
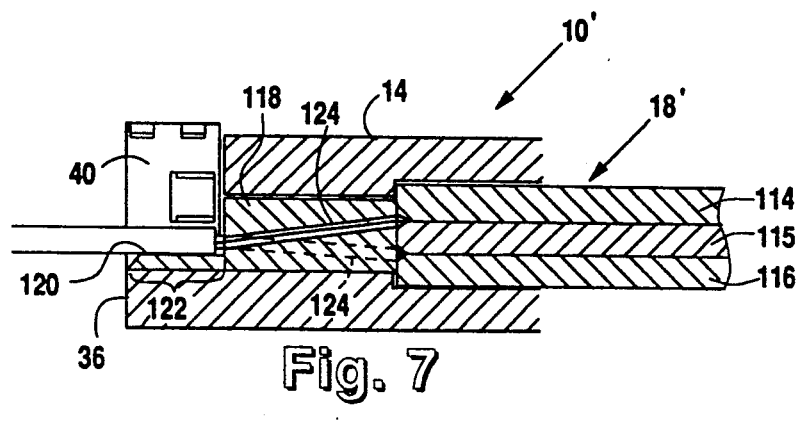
FIG. 7 is a perspective view of the stacked splice embodiment of the present invention.

Two alternative embodiments and design modifications are shown in FIGS. 6 and 7. FIG. 6 illustrates a modified end cover 42, which may be used on both jacket extension 36 and cap extension 38. End cover 42' is used to provide additional environmental sealing, by means of a compartment 104 defined by a wall 106 which is attached to the inner surface of cover 42' by a living hinge 108. As end cover 42, is closed, wall 106 contacts extension 38, Causing wall 106 to compress a sealant material, whioh may include index matching gel, residinq in compartment 106. Wall io6 has channels 110 therein which allow the sealant to escape from compartment 104, and flow in and around the entrance to slot 26. A web 112 is preferably integrally formed with wall 106, extending into compartment 104, which assures that sealant will be directed out of channels 110 when cover 42' is closed, and also provides resistance against such closure to prevent accidental leakage of the sealant.

FIG. 7 depicts a stacked splice device 10' which utilizes a splice element 18' having two layers of splices. Stacked splice element 18' may be formed of three separate elements, but it is preferably constructed of a single element having two integral hinges, folded into a Z-shape (accordion-fold). In this manner, the three sections of the sheet defined by the hinges result in three different plates 114, 115 and 116. It is not necessary that the two splice layers formed thereby be parallel, but this is preferred to simplify the wedge actuation. An alternative construction would provide a single sheet of material having two parallel hinges separated by a small distance, e.g., 50 $\mu$m, forming the upper and lower plates, with a third plate inserted therebetween. A plug 118 having two sets of orifices 124 is advantageously used to guide a first set of fibers, i.e., every other fiber, upwards to the top splice layer, and the remaining fibers downwards to the bottom splice layer. Guide plug 118 has grooves 120 formed in a porch area 122 thereof, similar to porch 84 of element 18; grooves 120 help align the fibers with orifices 124. Of course, the use of an accordion fold and guide plug could be expanded to splice elements having more than two splice layers.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, a multiple fiber splice device may be constructed to allow separate termination of each fiber set by providing two actuation wedges, one at each end of splice body 12; this would allow the pretermination of one fiber set in the clamped state. It is therefore contemplated that such modifications can be made without departing from the spirit or scope of the present invention as defined in the appended claims.

We claim:

1. A multiple optical fiber splice device comprising:
splice element means for holding a plurality of optical fibers;
a splice body having a slot therein, said splice element means located in said slot, and said splice body further having a first end, said slot extending through said splice body to said first end thereof;
a first extension member attached to said first end of said splice body, said first extension member having a surface adjacent said slot for supporting a portion of the optical fibers;
means for covering said supporting surface ofs aid extension member; and
means for applying a sealant material proximate said slot at said first end of said splice body.

2. The device of claim 1 further comprising means for attaching said covering means to said first extension member.

3. The device of claim 2 wherein said covering means has an open position and a closed position, said slot being accessible at said first end of said splice body when said covering means is in said open position, but being inaccessible when said covering means is in said closed position.

4. The device of claim 1 further comprising means for securely maintaining said covering means in a closed position against said extension member.

5. The device of claim 4 wherein said means for securely maintaining said covering means in a closed position comprises:
at least one latch member attached to said covering means; and
notch means formed in said first extension member for receiving said latch member.

6. The device of claim 1 wherein said covering means includes first and second leg members extending toward said supporting surface of said first extension member, said first leg member being adjacent a first side of said slot, and said second leg member being adjacent a second side of said slot.

7. The device of claim 1 wherein said covering means comprises an end cover which is pivotally attached to said first extension means.

8. The device of claim 7 wherein said first extension has first and second paralle, axially aligned trunnions, and said end cover has first and second arcuate jaws rotatably attached to said first and second trunnions, respectively.

9. The device of claim 1 wherein said first extension member is integrally formed with said splice body.

10. The device of claim 1 wherein said splice body has a second end, said slot extending through said splice body to said second end thereof, anad further comprising a second extension member attached to said second end of said splice body, said second extension member also having a surface adjacent said slot for supporting a portion of the optical fibers.

11. The device of claim 1 wherein said applying means is integrally formed with said covering means, and said sealant material is applied when said covering means is moved from an open position to a closed position.

12. A device for splicing a first plurality of optical fibers to a second plurality of optical fibers, the device comprising:
splice element means for holding the first and second pluralities of optical fibers;
a splice body having a slot therein, said splice element means located in said slot, and said splice body further having first and second ends, said slot extending through said splice body from said first end to said second end;
a first extension attached to said first end of said splice body, said first extension having a first surface adjacent said slot for supporting a portion of the first plurality of optical fibers;
a second extension attached to said second end of said splice body, said second extension having a second surface adjacent said slot for supporting a portion of the second plurality of optical fibers;
first means for covering said first surface ofs aid first extension;
second means for covering said second surface ofs aid second extension;
first means for applying a sealant material proximate said slot at said first end of said splice body when said first covering means is moved from an open position to a closed position; and
second means for applying a sealant material proximate said slot at said second end of said splice body when said second covering means is moved from an open position to a closed position.

13. The device of claim 12 wherein said first and second extensions are integrally formed with said splice body.

14. The device of claim 12 further comprising first and second means for securely maintaining said first and second covering means in closed positions against said first and second extensions, respectively.

15. The device of claim 14 wherein:
said first means for securely maintaining said first covering means in a closed position comprises first and second latch members attached to said first covering means, and first notch means formed in said first extension for receiving said first and second latch members; and
said second means for securely maintaining said second covering means in a closed position comprises third and fourth latch members attached to said second covering means, and second notch means formed in said second extension for receiving said third and fourth latch members.

16. The device of claim 12 wherein said first and second covering means comprise first and second end covers which are pivotally attached to said first and second extensions, respectively.

17. The device of claim 12 wherein:
said first means for applying a sealant material proximate said slot at said first end of said splice body comprises a first wall hingedly attached to an inner surface of said first covering means, said first wall defining a first compartment which is filled with said sealant material, and said first wall having a channel therein which, when said covering means is in said closed position, is adjacent said slot at said first end of said splice body; and
said second means for applying a sealant material proximate said slot at said second end of said splice body comprises a second wall hingedly attached to an inner surface of said second covering means, said second wall defining a second compartment which is filled with said sealant material, and said second wall having a channel therein which, when said covering means is in said closed position, is adjacent said slot at said second end of said splice body.

18. A device for splicing a first plurality of optical fibers to a second plurality of optical fibers, the device comprising:
- a splice element having means for holding the first and second pluralities of optical fibers;
- a generally rectangular splice body having a slot therein, said splice element being located in said slot, and said splice body further having first and second ends, said slot extending through said splice body from said first end to said second end;
- a first extension attached to said first end of, and integrally formed with, said splice body, said first extension having a first recessed surface adjacent said slot for supporting a portion of the first plurality of optical fibers;
- a second extension attached to said second end of, and integrally formed with, said splice body, said second extension having a second recessed surface adjacent said slot for supporting a portion of the second plurality of optical fibers;
- a first end cover pivotally attached to said first extension, positionable in open and closed positions, said first end cover covering said first recessed surface when in said closed position, and said first end cover having a first wall hingedly attached to an inner surface of said first end cover, said first wall defining a first compartment which is filled with a first sealant material, and said first wall having a first channel therein which, when said first end cover is in said closed position, is adjacent said slot at said first end of said splice body;
- a second end cover pivotally attached to said second extension, positionable in open and closed positions, said second end cover covering said second recessed surface when in said closed position, and said second end cover having a second wall hingedly attached to an inner surface of said second end cover, said second wall defining a second compartment which is filled with a second sealant material, and said second wall having a second channel therein which, when said second end cover is in said closed position, is adjacent said slot at said second end of said splice body; and
- first and second means for securely maintaining said first and second end covers in said closed positions, respectively.

19. A multiple optical fiber splice device comprising:
- splice element means for holding a plurality of optical fibers;
- a splice body having a slot therein, said splice element means located in said slot, and said splice body further having a first end, said slot extending through said splice body to said first end thereof;
- a first extension member attached to said first end of said splice body, said first extension member having a surface adjacent said slot for supporting a portion of the optical fibers, and further having first and second paralle, axially aligned trunnions; and
- an end cover having first and second arcuate jaws rotatably attached to said first and second trunnions, respectively.

* * * * *